Patented Mar. 22, 1949

2,465,307

UNITED STATES PATENT OFFICE 2,465,307

ARSONO COMPOUNDS AND METHOD OF PREPARATION

Herman Herbert Fox, Passaic, and Wilhelm Wenner, Montclair, N. J., assignors to Hoffmann-La Roche Inc., Nutley, N. J., a corporation of New Jersey No Drawing. Application November 27, 1946, Serial No. 712,739

10 Claims. (Cl. 260—443)

The present invention relates to new arsono compounds and to their preparation.

In one of its preferred embodiments, the invention relates to N-(p-arsonobenzyl)-glycineamide which is represented by the following formula:

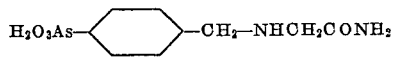

and the salts thereof.

N-(p-arsonobenzyl)-glycineamide is an active compound which possesses a high degree of stability and low toxicity. In addition, it does not produce neurotoxic symptoms in experimental animals. The compound is completely stable in both the solid form and in solution. Furthermore, it is very soluble in dilute hydrochloric acid and is also soluble in dilute acetic acid.

The N-(p-arsonobenzyl)-glycineamide is, in addition, a valuable intermediate for the synthesis of new arsenoso compounds which are described in our application Serial No. 712,740, filed November 27, 1946.

N-(p-arsonobenzyl)-glycineamide can be readily prepared by reacting p-arsonobenzylamine dissolved in an alkaline aqueous solution, such as an aqueous solution of sodium hydroxide, potassium hydroxide, ammonium hydroxide, or an alkali metal carbonate, such as sodium carbonate, potassium carbonate and the like, with a halogenoacetamide as, for example, chloroacetamide. The N-(p-arsonobenzyl)-glycineamide can be readily obtained from the reaction mixture by acidifying with an acid, such as glacial acetic acid and precipitating with ethyl alcohol. The precipitate is nearly pure N-(p-arsonobenzyl)-glycineamide. This compound can be further purified by recrystallization from dilute ethanol, the product being obtained in the form of lustrous, colorless plates, M. P. 236° C. (with decomposition).

N-(p-arsonobenzyl)-glycineamide readily forms salts with alkalis as well as with acids. Thus, with one mol of sodium hydroxide, monosodium-N-benzylglycineamide-p-arsonate is obtained, while with two mols of sodium hydroxide there is obtained the disodium salt. With hydrochloric acid, N-(p-arsonobenzyl)-glycineamide hydrochloride, which is readily soluble in water, is formed.

The following examples will serve to illustrate the method of producing our new compounds.

EXAMPLE 1

140 grams of p-arsonobenzylamine (described by Doak, Eagle and Steinman, J. A. C. S. 62, 3010 [1940]), dissolved in 1300 cc. of hot N sodium hydroxide are treated with 113 grams of chloroacetamide. After boiling the solution for about ten minutes, the solution is acidified with glacial acetic acid, filtered hot and treated with 1700 cc. of ethyl alcohol. The mixture is cooled and the precipitate is filtered off and dried. The precipitate is nearly pure N-(p-arsonobenzyl)-glycineamide. Upon recrystallization from dilute ethanol, the product is obtained in the form of lustrous, colorless plates which decompose at 236° C.

EXAMPLE 2

25 grams of p-arsonobenzylamine are treated with just enough hot 3N ammonium hydroxide to effect solution. The mixture is heated on a steam bath and 35 grams of chloroacetamide are added in portions. After some of the chloroacetamide has been added, a precipitate of p-arsonobenzylamine appears. The precipitate is redissolved by careful addition of ammonium hydroxide. Heating is continued until a sample of the reaction fails to yield a precipitate on acidification with acetic acid, which usually requires about one-half hour after all of the chloroacetamide has been added. The reaction mixture is then acidified with acetic acid to pH 5-6 and the product is precipitated by the addition of a large excess of ethyl alcohol. Upon recrystallization from dilute ethyl alcohol, the product, N-(p-arsonobenzyl)-glycineamide is obtained in the form of lustrous, colorless plates.

EXAMPLE 3

One gram of N-(p-arsonobenzyl)-glycineamide suspended in about 10 cc. of water is treated with 6.95 cc. of 0.5 N HCl. To the clear solution is added an excess of acetone to yield a precipitate of fine, colorless needles decomposing at 266° C. The N-(p-arsonobenzyl)-glycineamide hydrochloride thus obtained is very soluble in water, but insoluble in organic solvents.

EXAMPLE 4

Two grams of N-(p-arsonobenzyl)-glycineamide are suspended in a little water and treated with 7.15 cc. of 0.972 N sodium hydroxide. To the clear solution is added an excess of alcohol to yield a white microcrystalline precipitate of monosodium-N-benzylglycineamide-p-arsonate. The salt does not melt under 300° C. By employing 14.3 cc. of 0.972 N sodium hydroxide, disodium-N-benzylglycineamide-p-arsonate is formed.

While the invention has been specifically exemplified above in terms of N-(p-arsonobenzyl)- glycineamide and the salts thereof, in general, it embraces compounds of the following general formula:

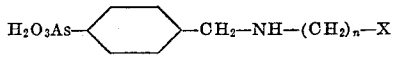

and the salts thereof.

In the above formula, $n$ is a small positive integer such as 1, 2 or 3, and X stands for a carboxyl, carbamyl, nitrile or hydroxy group.

Thus, for example, the following arsono compounds can also be prepared:

N-(p-arsonobenzyl)-glycine
β-(p-arsonobenzylamino)-propionic acid
β-(p-arsonobenzylamino)-propionamide
β-(p-arsonobenzylamino)-propionitrile
β-(p-arsonobenzylamino)-ethanol and the salts thereof with acids such as hydrochloric and sulfuric acid, or with alkali metals such as the sodium and potassium salts.

The following examples will serve to illustrate the preparation of the above-mentioned compounds.

EXAMPLE 5

*N-(p-arsonobenzyl)-glycine*

2.4 grams of p-arsonobenzylamine are dissolved in 31 cc. of 1 N. NaOH. To the solution is added two grams of chloroacetic acid. Addition of the chloroacetic acid results in a precipitate of some of the arsonobenzylamine. The precipitate is redissolved by the addition of sodium hydroxide. The mixture is then heated on a steam bath until a test sample of the mixture fails to yield a precipitate of p-arsonobenzylamine upon acidification with acetic acid, which usually requires about one-half hour. The reaction mixture is acidified with glacial acetic acid and a large excess of ethyl alcohol is added to yield an oily precipitate. Upon washing the oil with fresh ethyl alcohol, it solidifies. The product is very soluble in water and in hot glacial acetic acid. It is purified by solution in hot glacial acetic acid and reprecipitation with ethyl alcohol. The white powder is washed with ethyl alcohol and dried. M. P. (decomposes with previous softening) 142–143° C.

EXAMPLE 6

*β-(p-arsonobenzylamino)-propionitrile*

50 grams of the arsonobenzylamine are dissolved in a slight excess of 2N-sodium hydroxide (approximately 250 cc.) and 14.5 cc. (1 equivalent) of acrylonitrile are added. The two-phase mixture is shaken for about three-quarters hour, at the end of which time solution is complete. The solution is permitted to stand for another one-half hour and is then acidified with glacial acetic acid. The resulting precipitate is filtered off, washed with water and recrystallized from water to yield pure β-(p-arsonobenzylamine)-propionitrile. The product consists of colorless needles which darken but do not melt below 300° C. It is soluble in dilute HCl, dilute NaOH and hot water, slightly soluble in cold water and insoluble in ethyl alcohol and acetone.

EXAMPLE 7

*β-(p-arsonobenzylamino)-propionamide*

Two grams of the nitrile described in Example 6 are dissolved in 6 cc. of concentrated hydrochloric acid and the solution is permitted to stand overnight at room temperature. This solution is then adjusted to pH 5 with sodium acetate solution and the mixture is treated with an excess of ethyl alcohol and acetone to yield a precipitate of β-(p-arsonobenzylamino)-propionamide. The product is purified by dissolving it in cold water, heating the resulting solution and then adding ethyl alcohol. On cooling, small white needles are obtained which are very soluble in water and insoluble in ethyl alcohol, acetone and ether. The compound darkens but does not melt below 300° C.

EXAMPLE 8

*β-(p-arsonobenzylamino)-propionic acid*

A. One gram of the nitrile described in Example 6 is dissolved in an excess of concentrated hydrochloric acid and the solution is evaporated to dryness on the steam bath. The solid residue is then dissolved in water and neutralized with sodium acetate solution to yield a precipitate of β-(p-arsonobenzylamino)-propionic acid. When recrystallized from hot water, the product is obtained in the form of small white flakes, insoluble in cold water and organic solvents and soluble in dilute hydrochloric acid, diluted sodium hydroxide and hot water. M. P. (decomposes with frothing) 235–236° C.

B. A solution of one gram of the amide, described in Example 7, in an excess of concentrated hydrochloric acid is evaporated on the steam bath to dryness. The solid residue is worked up as described in part A to yield the same product.

EXAMPLE 9

*β-(p-arsonobenzylamino)-ethanol*

A solution of 50 grams of the p-arsonobenzylamine in 450 cc. of 1 N-sodium hydroxide is treated with 28 cc. of ethylene chlorohydrin and the mixture is refluxed for approximately eight minutes. The reaction mixture is acidified with an excess of glacial acetic acid and is concentrated to about 275 cc. The concentrate is filtered to remove any unchanged amine and the clear filtrate is treated with a large excess of ethyl alcohol. The precipitated product is filtered off and purified by solution in water, treatment with decolorizing charcoal and reprecipitation with acetone. The product, β-(p-arsonobenzylamino)-ethanol, is obtained as a white powder soluble in water and insoluble in organic solvents. M. P. with decomposition, 251–252° C.

We claim:

1. A compound selected from the group consisting of N-(p-arsonobenzyl)-glycineamide and the salts thereof.

2. N-(p-arsonobenzyl)-glycineamide hydrochloride.

3. Monosodium-N-benzylglycineamide-p-arsonate.

4. Disodium-N-benzylglycineamide-parsonate.

5. A method of preparing N-(p-arsonobenzyl)-glycineamide and the salts thereof which comprises reacting p-arsonobenzylamine in alkaline solution with a halogenoacetamide.

6. A method of preparing N-(p-arsonobenzyl)-glycineamide and the salts thereof which comprises reacting p-arsonobenzylamine dissolved in sodium hydroxide solution with chloroacetamide.

7. A method of preparing N-(p-arsonobenzyl)-glycineamide and the salts thereof which comprises reacting p-arsonobenzylamine dissolved in aqueous ammonium hydroxide solution with chloroacetamide.

8. A method of preparing N-(p-arsonobenzyl)-glycineamide and the salts thereof which comprises reacting p-arsonobenzylamine dissolved in aqueous potassium hydroxide solution with chloroacetamide.

9. A compound of the following formula:

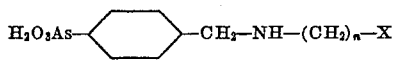

and the salts thereof, wherein $n$ is a small positive integer and X stands for a radical selected from the group consisting of carboxyl, carbamyl, nitrile and hydroxyl.

10. N-(p-arsonobenzyl)-glycineamide.

HERMAN HERBERT FOX.
WILHELM WENNER.

REFERENCES CITED

The following references are of record in the file of this patent:

UNITED STATES PATENTS

| Number | Name | Date |
|---|---|---|
| 1,801,535 | Adams et al. | Apr. 21, 1931 |
| 1,835,433 | Schmidt | Dec. 8, 1931 |

OTHER REFERENCES

Friend, ed. "Textbook of Inorganic Chemistry," vol. XI, Pt. II, by Goddard, "Organometallic Compounds" (1930), pages 231–233.

Doak et al., "J. Am. Chem. Soc.," vol. 62, pages 3010–3011 (1940).